P. POWELL.
DISTENSION DEVICE FOR TUBULAR STRUCTURES.
APPLICATION FILED AUG. 22, 1912.
1,140,527. Patented May 25, 1915.
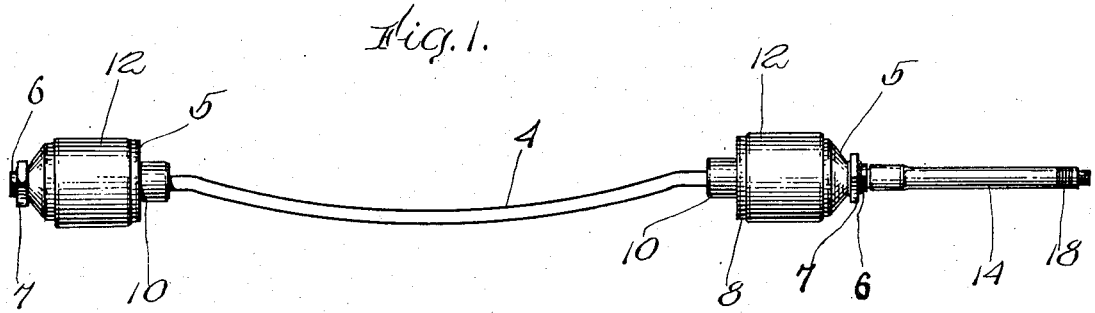
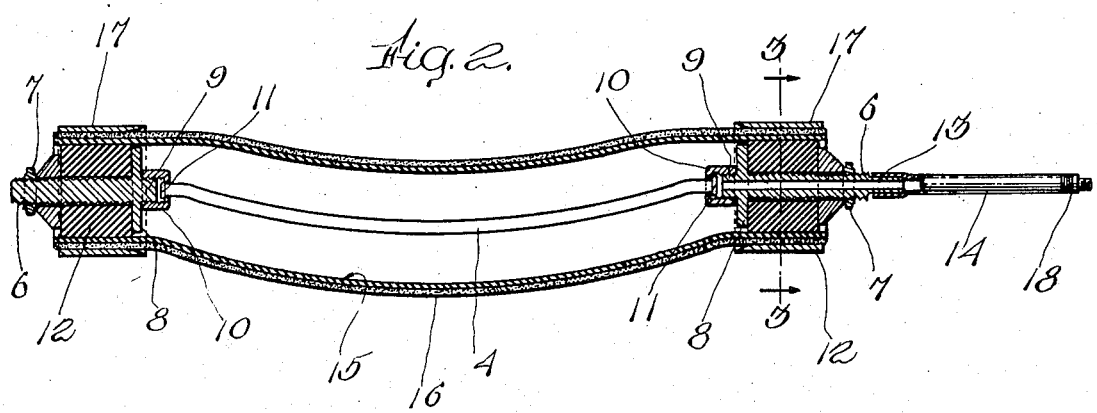
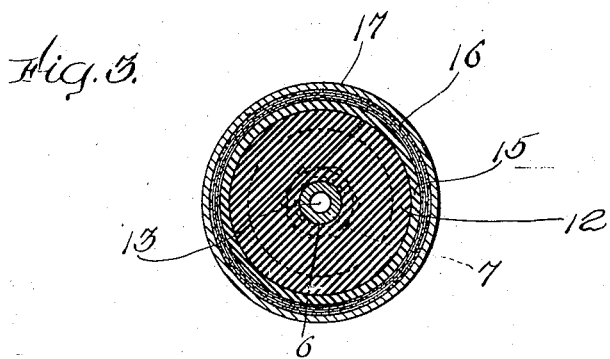
Witnesses:
Joseph H. Knight
Elizabeth S. O'Connor
Inventor:
Peter Powell,
by Everett N. Curtis
Atty.

UNITED STATES PATENT OFFICE.

PETER POWELL, OF CAMBRIDGE, MASSACHUSETTS, ASSIGNOR TO STANDARD TIRE AND RUBBER COMPANY, OF BOSTON, MASSACHUSETTS, A CORPORATION OF MASSACHUSETTS.

DISTENTION DEVICE FOR TUBULAR STRUCTURES.

1,140,527.  Specification of Letters Patent.  Patented May 25, 1915.

Application filed August 22, 1912. Serial No. 716,372.

*To all whom it may concern:*

Be it known that I, PETER POWELL, a citizen of the United States, residing at Cambridge, in the county of Middlesex and State of Massachusetts, have invented new and useful Improvements in Distention Devices for Tubular Structures, of which the following is a specification.

My invention relates to distention devices for tubular structures and its objects are to distend and support the wall of collapsible tubes; to effect a ready means for repairing automobile tires, and to render more effective the arrangement and operation of the various parts.

My invention primarily consists of two expansible members connected by a curved metallic rod, the wall of each of said members being adapted to expand outwardly toward the wall of a surrounding ring, and thereby to secure and hold in the space between said walls the ends of a collapsible or expansible tube of rubber or like material.

My invention further consists in the various modifications and novel arrangement of parts more specifically hereinafter pointed out and claimed.

In repairing automobile tires at the present day, it is the common practice where a tire has been punctured, to cut away the parts about said puncture and to repair the same by applying and cementing to the body of said tire, various layers of rubber and friction stock until the said puncture has been closed. After the opening caused by the puncture has been thus partially repaired, it is the usual practice to introduce within the said tire an expansible air bag which is specially constructed for the purpose; it being usually made in the form of an elongated rubber cylinder with sold ends and means being provided for introducing air and expanding the same after it has been installed. The said rubber bags are collapsible, and while in a collapsed state they are introduced within the said automobile tire at the region adjacent the partially repaired puncture. The tire is then placed in a rigid metal mold, the parts of which are firmly clamped together. After the tire has been placed in the mold, the air bag is then distended by forcing air within the same, and the walls of the bag are forced outwardly against the wall of the tire; thereby forcing the said wall, and particularly the covered portion of the puncture against the surface of the mold. The mold is now taken to a heating chamber, where the tire is subjected to a temperature of about 275 degrees Fahrenheit for about fifty minutes, this being the time required in the average case, the time varying somewhat, however with the size of the tire.

I have found that the air bags now upon the market are subject to very serious defects. All the air bags now employed are constructed of rubber and canvas, the proportion of rubber and canvas, however, varying in different bags; and in some bags, asbestos being used as a constituent part of a protective outer covering. In all such bags, it has been found that owing to the fact of their being constantly subjected to high temperatures, they rapidly deteriorate; and it is unusual that a bag of such character can be used effectively more than fifty times. In the majority of cases, the bags become unfit for use long before such limit has been reached. Owing to the intense heat sustained by such bags in the heating chamber the rubber soon becomes extremely dry and hard and they are likely to crack open or "burn out" at any time, in which case they collapse and are rendered absolutely unserviceable.

Where the best of materials are used, the life of the bag may be somewhat prolonged. And in the cases where the asbestos covering is employed, the period of usefulness of the bag is somewhat extended; but even with the use of asbestos, the other materials entering into the construction of the bag will inevitably deteriorate and the life of the bag not be prolonged except to a comparatively small extent. Furthermore, as is obvious, the ends of the bag must be quite solid in order to sustain the pressure of the air within, seventy-five pounds to the inch being the usual amount which the bag is required to sustain in addition to the increased expansive power of said air because of the heat to which it is exposed in the chamber. Such ends are an expensive portion of the bag and have to be carefully constructed in order that they may discharge the office which they are called upon to perform.

Attention is hereby directed to the accompanying drawing in which similar numerals of designation refer to similar parts throughout the several views.

Figure 1 is a side elevation of my improved structure, the rings and body wall not being shown; Fig. 2 is a longitudinal section of my device showing the same after the parts have been completely assembled; Fig. 3 is a vertical section on line 3—3 of Fig. 2, looking in the direction of the arrows.

Referring to the drawing: At the ends of the rod 4, which is constructed preferably of metal and is curved in form, I secure the members 5, 5, each of which is constructed with a shank 6, one end of which is threaded to engage with the nut 7, and the other end of which is formed in a head 8. Upon the inner portion of said head is the threaded boss 9, which engages with the threaded collar 10. The inner portion of said threaded collar is constricted, the better to engage with the heads 11, of the rod 4, but at the same time allowing free play of the same. Within the spaces formed between the heads 8, 8 and the nuts 7, I introduce the sleeves 12, made preferably of rubber or the like but which may be of any expansible material which would serve for the purpose. One of the shanks 6 is constructed with the bore 13 for the purpose of permitting air to pass through the same to the region between the two members 5, 5, the ordinary rubber tube 14, with the air valve 18 being secured to the free end of said shanks.

When my device is employed for the purpose of repairing automobile tires, I first introduce the same within the expansible tube 15, which ordinarily is formed of junk rubber tubing, or other similar material. I then cover the exterior of said tubing with layers of cotton fabric. While I prefer to use cotton fabric for such purpose, any kind of fabric may be used, provided it serves the purpose of protecting the exterior of said tube 15. To secure the ends of said tube and layers to the members 5, 5, I employ the metallic rings 17, 17, which are constructed of such diameter as very nearly to fit over the rubber sleeves 12 when covered by the tube and wrappings surrounding the same. Then by tightening the nuts 7, 7, I expand outwardly the rubber sleeves against the inner walls of the rings 17, thus hermetically closing the ends of the tubing and forming an air tight joint. After my device has been assembled as aforesaid, it is then used in the same manner as other air bags now upon the market.

No care has to be exercised in installing my device. It makes no difference how my bag is picked up or how placed in the tire, it will always automatically shape itself to the position of such tire. The curve in the steel rod will always conform to the curve of the tire. There is no possibility of straining the air bag longitudinally when the same is removed from the tire as in other bags in common use, since such strain in my device all comes on the rod. Neither as with such other bags, must care be exercised to prevent the bag from bending from the shape in which it is made and cracking the case thereby, since my air bag is so flexible that it may bend in any direction.

By the use of the freely moving metal rod 4, I hold my bag in proper longitudinal distention without being obliged to employ the stiff walled structure now in use so made to prevent the bag from being pulled or picked out of shape. No one so far as I am aware, prior to myself has successfully used a rod to keep the ends of the bag in proper relation. In view of the fact that I employ in the use of my invention the rubber sleeves 12 together with strips of junk tubing and cheap cotton cloth which can be readily replaced at a very small cost, I believe that I have produced a device the essential working parts of which are practically indestructible.

While not essential to the operation of my device, I prefer to construct the collar 10 as shown with considerable play between the same and the shank of the rod 4 in order that the members 5 may assume such positions within the rubber tire as will permit the surfaces of the same to readily conform with the inner surface of the tire.

While I have described the use of my invention with particular reference to automobile tires, I by no means desire to limit the application of my invention solely to this field since as is obvious my inventon could be used in other ways and other manners where distention or supporting devices are required for tubular structures without departing from the spirit of my invention.

What I claim and desire to secure by Letters Patent is:—

1. A distention device for tubular structures comprising an elongated air tight bag, outwardly expansible cylindrical heads located within and secured to the ends of said bag to tightly close the same, and a rod conforming to the curvature of said tubular structure and having its extremities connected with the respective heads.

2. A distention device for tubular structures comprising an elongated air tight bag, outwardly expansible cylindrical heads located within and secured to the ends of said bag to tightly close the same, a rod conforming to the curvature of said tubular structure and having its extremities connected with the respective heads, one of said heads being provided with an air valve, and means whereby air may be introduced through the last mentioned head.

3. A distention device for tubular structures comprising an elongated air tight bag, outwardly expansible cylindrical heads located within and secured to the ends of said bag to tightly close the same, a curved rod conforming to the curvature of said tubular body, and connections between the extremities of said rod and the respective heads, said connections permitting the heads to conform to the inner surface of the tubular structure.

4. In a device for distending the wall of tubular structures, a collapsible tube, two cylindrical members each having a recess in one side thereof and located within said tube at one of its ends, a curved rod the ends of which are enlarged and are secured within said recesses, said recesses permitting free movement of said members upon the ends of said rod.

5. In a device for distending the wall of tubular structures, a curved rod, the ends of which terminate in heads, two spool shaped members each of which bears a boss movably secured to one of said heads, and which carries upon its shank a collar of expansible material, said shank being threaded at one end, and a nut engaging with the threaded portion of said shank, combined with a collapsible tube covering said rod and members and rings securing the ends of said tube to the periphery of said collars.

6. In an expansible air bag for vulcanizing purposes, the combination with two expansible heads each having a socket for a ball, of a curved rod which connects said heads and is provided with a ball at each end which is seated in a socket therein, an elastic section of tube which passes over said heads, cloth wound around said tube, rings which extend around the cloth around the tube and around each head, and a passage through one head which connects with a valve whereby the air bag may be inflated.

7. An air bag for vulcanizing purposes which comprises two heads each of which has a socket, a curved rod each end of which is pivoted in one of said sockets, an elastic section of tube between and inclosing said heads, means for detachably attaching said elastic section of tube to the heads, and a passage through one head and a valve through which air may be introduced into the interior of the elastic section of tube.

8. In an air bag for vulcanizing purposes, the combination with two expansible heads each comprising compression plates and an elastic packing ring there between, of a curved rod each end of which is pivotally connected to one of said heads, an elastic section of tube between and inclosing said heads, rings which extend around the tube around each head, and a passage through one head and a valve through which air may be introduced into the interior of the elastic section of the tube.

In testimony whereof I have hereunto set my hand in presence of two subscribing witnesses.

PETER POWELL.

Witnesses:
 ROBERT JACKSON CRAM,
 ELIZABETH S. O'CONNOR.